May 5, 1964 F. BAUR 3,132,292
PHASE COMPENSATING WHEATSTONE BRIDGE SERVOSYSTEM
Filed June 3, 1959 3 Sheets-Sheet 1

INVENTOR.
FRITZ BAUR
BY
ATTORNEY

INVENTOR.
FRITZ BAUR

INVENTOR.
FRITZ BAUR
BY
Horace B Van Valkenburgh
ATTORNEY

United States Patent Office 3,132,292
Patented May 5, 1964

3,132,292
PHASE COMPENSATING WHEATSTONE BRIDGE SERVOSYSTEM
Fritz Baur, Denver, Colo., assignor to Wm. Ainsworth & Sons, Inc., Denver, Colo., a corporation of Colorado
Filed June 3, 1959, Ser. No. 817,897
6 Claims. (Cl. 318—29)

This invention relates generally to electrical circuits and more particularly to an electrical circuit for an automatic analytical balance. The circuit of this invention is particularly useful in the automatic analytical balance of the co-pending application of Gordon S. Clayson, Serial No. 762,647, filed September 22, 1958, now U.S. Patent No. 3,086,603.

Prior to the balance of application Serial No. 762,647, attempts to produce an automatic analytical balance, none of which had been completely satisfactory, included limit switches operated by beam displacement, which requires an electrical connection to the beam, and a plunger suspended by the beam and movable in a magnetic coil, which is adversely affected by nearly magnetic fields or materials, or residual magnetism in the system. A variation in electrostatic capacity between an electrode connected to the beam and a stationary electrode, together with a motor drive to restore the balance beam to neutral position, had also been used, but the accuracy of electrodes depending upon electrostatic capacity is adversely affected by temperature or barometric changes, while a motor drive to restore the balance beam to neutral position seriously affects the accuracy of the beam itself. Another of such devices involved a capacitance bridge and a complicated vacuum tube circuit associated therewith, but the accuracy and precision of such a balance is adversely affected by tube characteristic variations and the capacitance bridge is adversely affected by temperature and barometric changes.

The automatic balance of the application of Gordon S. Clayson, Serial No. 762,647, includes, in combination, stationary and movable portions of the balance, an inductance sensitive transducer means mounted on the stationary portion of the balance and adapted to be connected in a signal producing circuit, such as a bridge circuit, and means operatively connected to a movable weight responsive portion of the balance, adapted to vary the inductance of the transducer coil means to produce an unbalance in the bridge circuit and an electrical output therefrom proportional to the amount and direction of movement of the movable portion of the balance. The present invention is exemplified in the circuit shown in the application of Gordon S. Clayson, Serial No. 762,647.

Among the objects of the present invention are to provide an improved electrical circuit, particularly adapted for use in an automatic balance system; to provide such a circuit which will permit the balance to detect load changes continually for periods of hours, days or even weeks; to provide such a circuit which is particularly useful with an automatic balance, the accuracy and precision of which are not adversely affected by variations in line voltage, tube characteristic variations, temperature or barometric changes, passage of time, nearby magnetic fields or materials, or residual magnetism in the associated system; to provide such a circuit adapted to receive a signal from a displacement detector operable to translate deflection of a balance beam from gravitational equilibrium into an electrical signal having a magnitude proportional to the displacement of the beam and a polarity dependent upon the direction of movement of the beam about its support; to provide such a circuit particularly useful with a balance which requires no electrical connection to the beam or other moving part; to provide a balance system which includes an improved circuit electrically connected between a balance and a recorder which provides a graphic recording of the weighing operation; to provide an improved circuit for a balance system which automatically and substantially instantaneously records the weight changes of a load in the form of a weight change versus time curve; and to provide such a circuit and balance system which will operate effectively and efficiently.

In accordance with the present invention, the improved circuit for use in an automatic balance system includes an oscillator circuit, a bridge circuit having an input and an output, means coupling the output of the oscillator circuit to the input of the bridge circuit, an amplifier circuit having an input and an output, means coupling the output of the bridge circuit of the input of the amplifier circuit, the amplifier including output transformer means having a near center tapped secondary winding and means coupling the output of the oscillator circuit to the center tap of the secondary winding of the amplifier output transformer.

Additional objects of the present invention, together with the novel features thereof, will be apparent from the following description, taken in connection with the accompanying drawings, in which.

Figure 1:
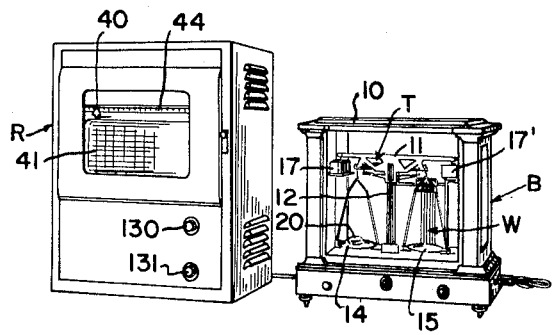
FIG. 1 is a front elevation of a balance and recorder, associated with which, to form a balance system, is a circuit constructed in accordance with this invention.

The circuit of this invention is shown for purposes of illustration as applied to weighing apparatus of the type known as analytical balances, although it will be evident that it may be applied to other types of weighing apparatus. Thus, an analytical balance B and recorder R of FIG. 1, together with the circuit of FIG. 4, comprises an automatic sensing and recording arrangement or balance system in accordance with this invention. The balance B may be the "Ainsworth" Type BR analytical balance, while the recorder R may be an "Ainsworth" Type AU-1 recorder. The balance B may include at conventional transparent case 10 which encloses the operating parts and protects the same from air currents and the like, such parts including a beam 11 pivoted on an upright beam support 12, as by a knife edge bearing, such as shown in the aforesaid application of Gordon S. Clayson, Serial No. 762,647. Pans 14 and 15 may be suspended from opposite ends of the beam, as from knife edge bearings, while an extension of each end of the beam 11 may be connected to the piston of the respective air dash pot 17 or 17' for damping purposes. The object to be weighed may be placed on pan 14, such as a quantity of evaporating liquid in a watch glass 20, while a series of weights may be placed automatically on pan 15, as by an automatic weight applying mechanism W, which may be operated by suitable mechanism in the base of case 10. If desired, a weight may be placed on pan 14 and an object to be weighed on pan 15.

As disclosed in the aforesaid application of Gordon S. Clayson, Serial No. 762,647, now U.S. Patent No. 3,086,603, a transducer T is associated with beam 11 and a stationary part of the balance, such as beam support 12, the transducer T being adapted to be mounted in several alternative ways, such as shown and described in application Ser. No. 762,647. The transducer T, as in FIG. 2, includes a coil spool 21 and a probe 22, the latter being moved by the beam but requiring no electrical connection and also being free of engagement with the coil spool 21 during movement, thereby introducing no frictional resistance to movement of the beam through movement of the probe or resistance to movement of the beam by virtue of an electrical connection thereto. The transducer T may be mounted in a manner such that probe 22 will move upwardly or downwardly in accordance with deflection of beam 11 and generally axially within vertical coil spool 21, the inner diameter of the latter being such that probe 22 will not engage the inside of spool 21 during such movement. The transducer T may, if desired, be mounted in a manner such that the axis of coil spool 21 is horizontal and probe 22 will move in a horizontal direction within coil spool 21 upon deflection of beam 11. Transducer T also may, if desired, be mounted with coil spool 21 vertical and probe 22 again mounted for vertical movement but suspended from a knife edge bearing, so that probe 22 will be maintained in vertical axial alignment with the coil spool 21 at all times. Such alternative manners of mounting the transducer T are shown in greater detail in the aforesaid application Serial No. 762,647.

Figures 2, 3:
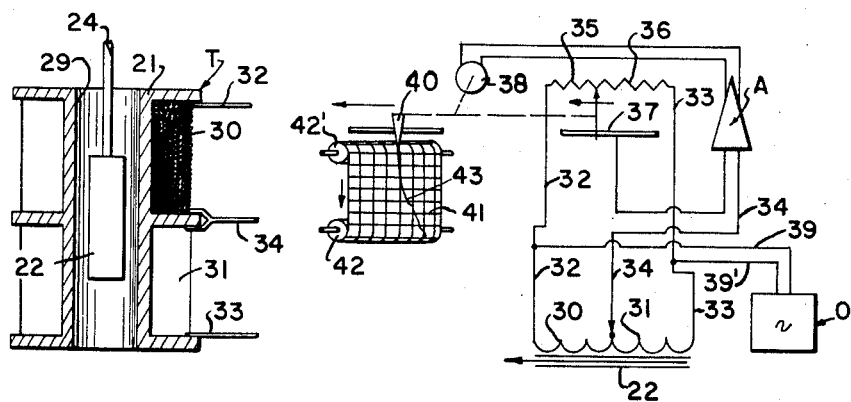
FIG. 2 is a longitudinal section, on an enlarged scale, of a transducer coil of FIG. 1, showing also one position of a probe therein.
FIG. 3 is a diagrammatic representation of a number of the elements of the balance system of FIG. 1.

The transducer T may be constructed generally as in FIG. 2, coil spool 21 being formed of non-magnetic material and provided with a bore 29 and a pair of axially spaced cylindrical spaces which receive two symmetrical windings 30 and 31 in series from leads 32 and 33 and tapped between at a lead 34. Probe 22 is formed of a material having a high permeability and is positioned within bore 29, but is always out of contact with the walls thereof. Such a transducer is a variable permeance type, which does not employ E-cores or other static flux-conducting components and does not set up a high flux density at any point. A variable permanence transducer has a minimum contrast in flux density, i.e., a reasonably homogeneous and uniform field.

In the diagram of FIG. 3, there are shown the desirable units to provide automatic operation of the balance. Transducer coils 30 and 31, as shown, comprise two legs of a bridge circuit with the resistance portions 35 and 36 of a slide-wire potentiometer 37 forming the other two legs of the bridge, leads 32 and 33 from the outer ends of coils 30 and 31 being connected respectively to the opposite ends of the resistances 35 and 36. Lead 34 from the common connection between coils 30 and 31 is connected to one input terminal of an amplifier A, while the slide-wire of potentiometer 37 is connected to the other input terminal of amplifier A, the output of which feeds a servo motor 38, which controls the position of slide wire potentiometer 37. The bridge circuit comprising coils 30 and 31 and resistances 35 and 36 is energized by means of an oscillator O which generates a high frequency alternating current. The high frequency signal from oscillator O is fed into the bridge by wires 39 and 39' at leads 32 and 33, i.e., between coils 30 and 31 and resistances 35 and 36, respectively. When probe 22 is moved within the transducer coils, as a result of deflection, the inductance of one coil 30 or 31 increases as the other decreases, producing an unbalanced condition in the bridge circuit and a bridge output signal to appear at lead 34, i.e., between the common connection of coils 30 and 31 and the slide-wire of bridge balance potentiometer 37. Different potentials will be present at these points, having a phase dependent upon the direction of movement of probe 22 and its position with respect to the previous null or zero point established by the bridge balance. The output from the bridge, when the probe is moved in one direction with respect to a null point, will be 180° out of phase with the output when probe 22 is moved in the opposite direction.

The output signal from the bridge, when balance beam 11 is displaced causing movement of probe 22 within the transducer coils, is amplified by amplifier A and energizes servo motor 38, which being connected to move the slide-wire of potentiometer 37 repositions the slide wire to produce a change in the relative resistance of the resistance portions 35 and 36 to reestablish a balanced condition in the bridge. When the bridge is in balanced condition, no output is supplied to amplifier A and servo motor 38 ceases to be energized. The servo motor is also connected to a writing pen and indicator 40 of recorder R, in effect a recording oscillograph, and causes the pen to be moved across a paper chart 41, which may be moved lengthwise under the pen such as at a constant speed, by rollers 42 and 42' powered by a conventional motor and gear train (not shown). As the chart is moved and the slide wire and pen are repositioned to produce a balanced condition, a trace 43 is made on the chart by the pen, indicating the amount of repositioning that took place during the time required for a predetermined length of chart to pass under the pen. Thus, each time probe 22 is moved by the deflection of beam 11, the slide wire is repositioned and the movement is recorded on chart 41 by pen 40. As will be evident, when the chart is moved, the trace 43 will indicate the loss or gain in weight of the object. The weight change may also be observed through a scale 44 of FIG. 1. If the object being weighed is a liquid in the watch crystal 20 of FIG. 1, then the loss of weight, as by evaporation, will be indicated on the chart by the trace 43. Or, a sample may be weighed periodically while undergoing an oxidation reaction, or subjected to corrosion, so that the trace 43 will indicate the gain or loss of weight at such time. Or, a sample may be heated to different temperatures and the result recorded by the trace 43. Again, a series of samples may be weighed, with the chart moved to a different position for each sample, so that the trace 43 will combine a permanent record of the weights of the samples. The latter is particularly advantageous in many instances, as for control purposes in a plant. Thus, the present invention is of particular advantage whenever weight vs. time, weight vs. temperature, or the like, is significant. When the object being weighed is being heated or undergoing corrosion, a conventional extension of a pan support may extend through the bottom or the top of housing 10 and into an insulated furnace, as for heating or oxidation, so that the balance will not be subjected to furnace temperatures.

Figure 4:
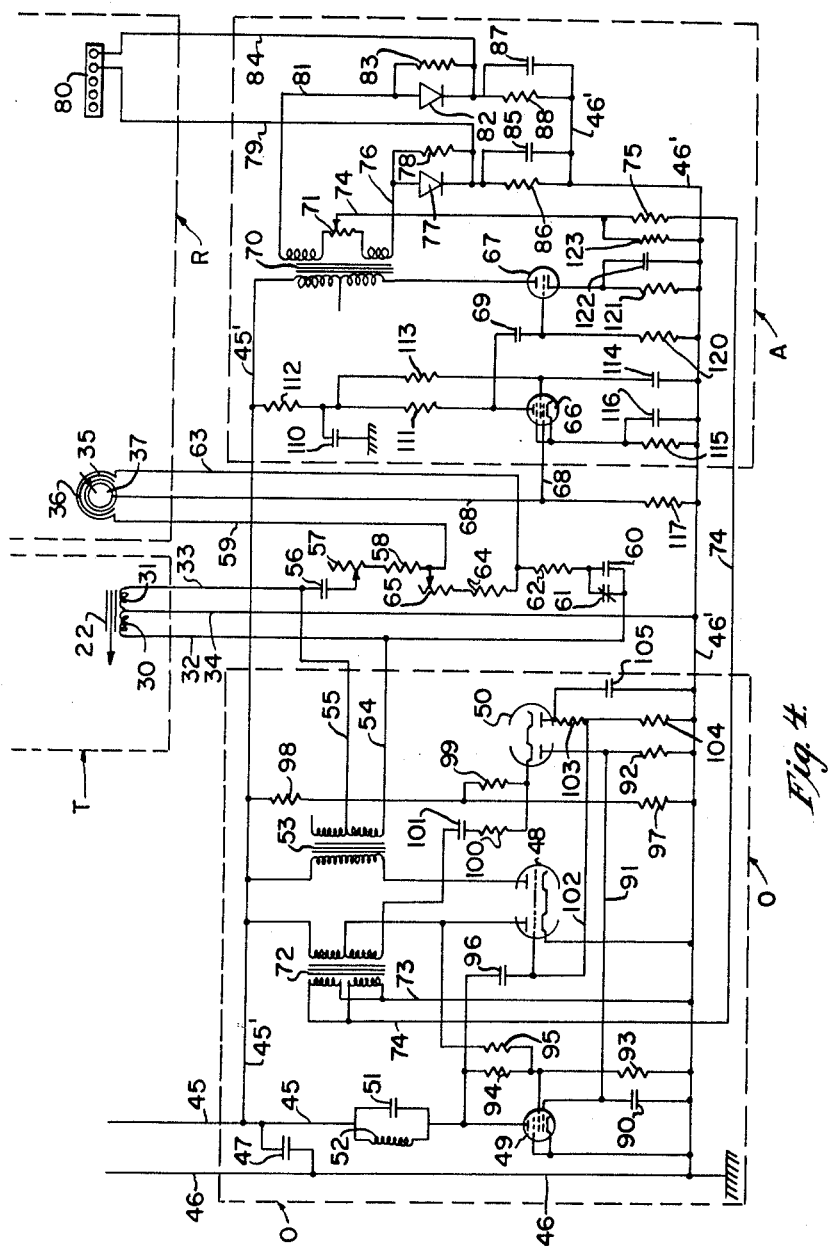
FIG. 4 is a circuit diagram of the electrical parts of a preferred form of this invention.

In the more complete circuit of this invention, shown in FIG. 4, those portions of the circuit comprising the amplifier A, the oscillator O and transducer T are each indicated by a dash line block, while the parts within recorder R are also indicated by a dash line block. A suitable associated power supply (not shown) may be connected to B+ input and ground leads 45 and 46, respectively, across which a condenser 47 may be connected. The oscillator O may include a duo-triode 48, a pentode 49 and a duo-diode 50. The frequency of oscillation may be varied by the choice of different values for a capacitor 51, which may be placed in parallel with a tank coil 52 in B+ input lead 45. The output from one half of duo-triode 48 is transformer coupled through a transformer 53 and lines 54 and 55 directly to opposite ends of the transducer coils by connection to the respective leads 32 and 33. The above is described more fully hereinafter. Line 55 is further connected to one end of the slide wire of potentiometer 37, serially through condenser 56, variable resistance 57, resistor 58 and line 59; while line 54 is further connected to the other end of the slide wire of potentiometer 37 serially through condenser 60, having variable condenser 61 in shunt, resistor 62 and line 63. The capacitive connection of potentiometer 37 with the other legs of the bridge, by means of capacitors 56 and 60, shunted by capacitor 61, provides means for reducing the error voltage to a minimum by matching the resistive components of the transducer coils with capacitive components in the potentiometer legs of the bridge, so as to produce a phase shift in the potentiometer legs which match the phase shift caused by the resistive components of the transducer coils. This feature is more completely described below, in connection with FIGS. 5–7. For calibration purposes, resistor 64 and variable resistor 65 are serially connected across lines 59 and 63, in shunt with potentiometer 37. Lead 34, the common connection between coils 30 and 31 of the transducer, is connected to ground potential line 46'.

The slide wire of potentiometer 37 is connected to the input of amplifier A, which comprises two stages of amplification provided by pentode 66 and triode 67, the slide wire of potentiometer 37 being connected to the control grid of pentode 66 via line 68. The anode of pentode 66 is coupled to the grid of triode 67, serially through capacitor 69, while the anode of triode 67 is connected to one side of the primary winding of an output transformer 70, the other side being connected to B+ potential line 45'. Transformer 70 has a split secondary winding, with the resistance of potentiometer 71 connected serially therebetween, thereby providing means for adjusting the symmetry or balance of the phase sensitive rectifier circuit, described below. The output of the first half of duo-triode 48 is transformer coupled through a transformer 72 via a split secondary connected in parallel and having one end connected to ground potential line 46' by a wire 73 and the other end connected to the sliding tap of the potentiometer 71 by a wire 74, serially through resistor 75, to effect electrical balance of the phase sensitive rectifier circuit. The introduction of a comparative signal centrally of the tapped secondary winding of the amplifier output transformer effects a high degree of electrical balance in the system. That is, the oscillator output at the transformer secondary is 180° out-of-phase with the amplifier output and thus provides a complete and stable electrical balance.

One end of the secondary of output transformer 70 is connected by a wire 76 serially through the phase sensitive rectifier circuit which includes diode 77 with resistor 78 in shunt, and a wire 79 connected to one input terminal of an input connection block 80 of recorder R, while the other end of the secondary of output transformer 70 is connected by a wire 81 serially through the phase sensitive rectifier circuit which further includes diode 82 with resistor 83 in shunt and a wire 84 connected to the other input of the connection block 80 of recorder R, the input terminals of which are also connected through a conventional chopper-amplifier with the servo-motor 38 of FIG. 3. The phase sensitive rectifier circuit also includes filters in the form of condenser 85 and resistor 86 connected in parallel between the cathode of diode 77 and ground potential line 46', with condenser 87 and resistor 88 connected in parallel between the cathode of diode 82 and ground potential line 46'. This circuit should be in balance. However, because of slight variations in the components making up the circuit, as a practical matter, the circuit will almost never be in exact balance. Thus, by advantageously providing a potentiometer 71 between the split secondary of transformer 70, the circuit may be easily and conveniently balanced at the factory.

The remainder of the parts shown in the circuit of oscillator O include a by-pass condenser 90 in the central grid circuit of pentode 49, also connected to the first half anode of duo-diode 50 by a wire 91, which is connected to ground potential line 46' through resistor 92. Voltage divider resistors 93 and 94 are connected with the suppressor grid of pentode 49, while resistor 95 is a plate load resistor for the first half of dual triode 48. A coupling condenser 96 is connected between the anode of pentode 49 and the grid of dual triode 48, while voltage divider resistors 97 and 98, in series with resistor 99, establish bias on the cathodes of duo-diode 50. Resistor 100 and condenser 101 are connected serially between the cathodes of duo-diode 50 and the primary of transformer 72. The control grid of duo-triode 48 is connected to the second half anode of duo-diode 50 by a wire 102, serially through resistor 103, and to ground potential line 46', serially through resistor 104, with a filter to ground through condenser 105. The anode of the first half of duo-triode 48 is connected to B+ potential line 45' through half of the primary winding of transformer 72, while the anode of the second half is connected to line 45' through the primary winding of transformer 53. Each of the tubes 48, 49 and 50 may be provided with heaters in a conventional manner.

The remainder of the parts shown in the circuit of amplifier A include an isolation condenser 110 in a voltage supply for the pentode 66, resistors 111 and 112 acting as a plate load therefor and as a voltage divider for the screen grid thereof. The screen grid circuit of pentode 66 also includes an isolation resistor 113 and a by-pass condenser 114, while the suppressor grid and cathode are connected together and to ground potential line 46' through a bias resistor 115, by-passed by condenser 116. The central grid of pentode 66 is also connected to ground potential through resistor 117. The control grid of triode 67 is biased to ground potential through resistor 120, while the cathode is connected to ground potential through resistor 121, which is by-passed by condenser 122. The anode of triode 67 is connected to B+ potential line 45' through the primary winding of transformer 70, which acts as the plate load, while a resistor 123, connected between line 74 to potentiometer 71 and ground potential line 46', acts to smooth out oscillations.

The amplifier A and oscillator O may be installed in a separate housing, or in the recorder housing, although the condensers 56, 60 and 61, resistors 58, 62, 64 and 117, and particularly variable resistors 57 and 65, may be installed in the recorder cabinet, so that the latter may be readily adjusted, as by knobs 130 and 131, respectively, of FIG. 1.

In the oscillator circuit, the signal from a plate of tube 49 is fed through capacitor 96 to the grid of the left section of tube 48. The signal reappears, amplified at the plate of this tube section, and will be 180° out of phase with the signal on the grid. From this plate, the signal is transmitted through resistor 95 back to the second grid of tube 49, which acts as a control grid. Thus, tube 49 has a phase-reversed signal of sufficient magnitude on its grid. The frequency of oscillation is determined by the resonance capacitor 51 and coil 52. However, the impedance will be a maximum only at one frequency, i.e., the resonance frequency, so that only a voltage at this frequency will appear on the grid of tube 48. All other frequencies will flow through the circuit to ground. This left section of tube 48 also acts simultaneously as an output tube, whose output is transmitted by transformer 72, through wires 73 and 74, to the phase-sensitive rectifier. The right section of tube 48 thus acts as a second output tube, having its grid connected to the grid of the left section.

Both halves of tube 50 are part of an automatic volume or amplitude control circuit. The primary winding of transformer 72 is connected through capacitor 101 and resistor 100 to the two cathodes of tube 50. At the same time, a positive bias voltage is applied to the cathode. This voltage is derived from the voltage divider, consisting of resistors 97 and 98. If the negative peak value of the oscillator voltage exceeds the positive bias voltage, the two sections of tube 50 will become conductive and negative voltages will appear at the plates. The negative voltage from the left section of tube 50 is transmitted to the first control grid of tube 49, while the negative voltage from the right section of tube 50 is transmitted to the two grids of the two sections of tube 48. Thus, the larger the oscillator voltage becomes, the more negative these grids become. This reduces the gain of tubes 48 and 49, which will in turn reduce the oscillator voltage, thus regulating the oscillator voltage to a constant value.

Figure 5:
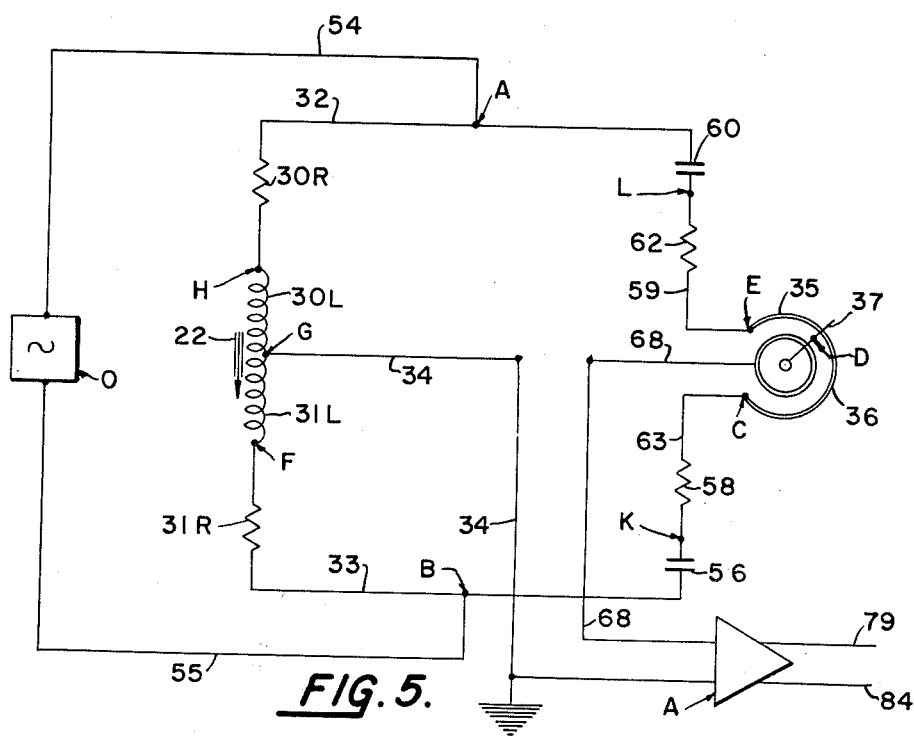
FIG. 5 is a diagrammatic representation of the bridge circuit, including a graphic representation of the resistance in the inductive leg of the bridge.
Figure 6:
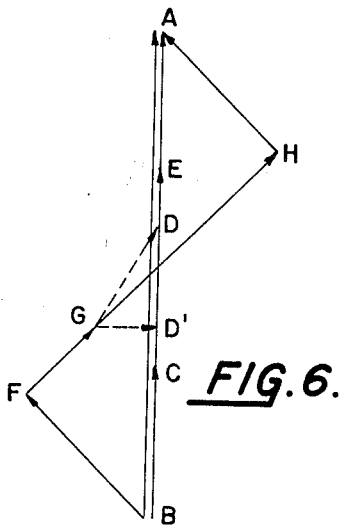
FIG. 6 is a vector diagram showing the voltage phase shifts in the bridge circuit without certain condensers, with the voltage drop across the potentiometer shown on an enlarged scale for clarity of illustration.
Figure 7:
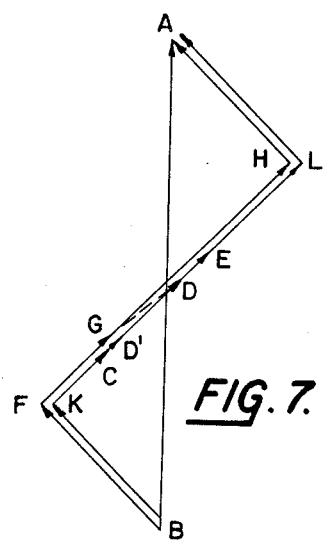
FIG. 7 is a vector diagram, similar to FIG. 6, but with the condensers installed in the bridge circuit.

The bridge circuit of FIG. 4 has been shown in simplified form in FIG. 5, so that the function of capacitors 56 and 60 may be more clearly understood. Thus, it can be seen that the current is supplied from oscillator O across the bridge at points A and B, while the output of the bridge is obtained between points G and D and amplified through amplifier A, which transmits this signal to the recorder R, shown in FIG. 4. The vector diagram of FIG. 6 shows the condition of the circuit if capacitors 56 and 60 are omitted, while FIG. 7 shows a vector diagram of the circuit with the capacitors in place. However, in each case vector C—E has been exaggerated in length for clarity of illustration, since it is actually only about 2½% of the length of line K—L. Thus, it can be understood that vector A—B represents the oscillator voltage applied to points A and B, while vector B—C represents the voltages across resistors 58, vector C—D represents the voltage across the first part of the slide wire 36, vector D—E represents the voltage across the second part of the slide wire 35, and vector E—A represents the voltage across resistor 62. All of these vectors are in phase with each other and with the supply voltage, i.e., vector A—B, because only resistive components are involved. They are shown slightly offset in the diagram for clarity only, but it will be understood that these vector lines would normally be superimposed. Thus, it can be seen that if slide 37 of the slide wire is moved, voltages C—D and D—E will change in length; however, their sums will stay the same. Thus, in FIG. 6, point D may move between points C and E on line C—E, so that for each position of the slider, there will be a corresponding position of point D on line C—E. Since the two halves 30 and 31 of the transducer coil have a complex impedance, consisting mainly of a resistive and an inductive component, they have been broken down in the circuit diagram of FIG. 5 into resistive components 30R and 31R and inductive components 30L and 31L and are represented in a corresponding manner on the vector diagrams of both FIGS. 6 and 7. Thus, vector B—F represents voltage across the resistive component 31R of coil 31, vector F—G represents the inductive voltage across the inductive component 31L, while vector G—H represents the inductive voltage across the inductive component 30L and vector H—A represents the resistive voltage across the resistive component 30R. It will be noted that the inductive and resistive voltages are at right angles to each other, being 90° out of phase, and that the vectors are shown so that a counterclockwise rotation of 90° brings the inductive voltage in line with the resistive voltage.

If probe 22 of the transducer is moved down, for example, the inductance of coil 31 will increase while the inductance of coil 30 decreases. This will not affect the resistive voltages, but the inductive voltages will change in value, although their sum will stay essentially the same. Thus, this change can be represented by moving point G along line F—H in the vector diagram of FIG. 6. For each position of probe 22, a corresponding position of point G will exist along line F—H. The bridge output voltage D—G is indicated by the dotted line vector D—G in FIG. 6. Now, if probe 22 moves, the voltage D—G will change in value. This voltage is supplied to the amplifier, which in turn supplies voltage to the servo motor, which will start to move the slider. The conditions are such that the servo motor has a directional sense to cause voltage D—G to be brought back to a minimum. In other words, the slider tends to follow any motion of probe 22. Thus, upon movement of the probe, the bridge will have an instantaneous output voltage of D—G, such as that illustrated in FIG. 6. However, the servo motor will move the slider 37 in a direction to bring this voltage to a minimum value, which occurs at point D'. The ideal situation is that in which voltage D—G can be brought to zero; however, this can only happen when point G happens to fall on the intersection lines F—H and C—E. However, in the example of FIG. 6, the minimum value of D—G is vector D'—G.

It is well known that any servo system performs best when the error voltage, i.e., voltage D—G, is as small as possible, preferably zero, for any position of probe 22. However, without capacitors 56 and 60, this cannot be accomplished, but by introducing the capacitors into the circuit, the voltage D—G may be made zero for all portions of the servo system. Therefore, assuming that capacitors 56 and 60 are in the circuit, as shown in FIG. 5, it can be seen from FIG. 7 that supply voltage vector A—B and vectors B—F, F—G, G—H and H—A remain unchanged. It will be noted that the capacitative voltages are at right angles to the resistive voltages and that a clockwise rotation of 90° will bring the capacitative voltages in line with the resistive voltages. This is the opposite direction of rotation than that of the inductive voltages. Therefore, it can be seen that vector B—K represents a capacitative voltage across capacitor 56, vector K—C represents a resistive voltage across resistor 58, vector C—D represents the resistive voltage across portion 36 of the slide wire, vector D—E represents the resistive voltage across portion 35 of the slide wire, vector E—L represents the resistive voltage across resistor 62 and vector L—A represents the capacitative voltage across the capacitor 60. Thus, the length of vectors B—K and L—A depend on the capacity value of the capacitors and they may be made any length by choosing appropriate values. Thus, by choosing a capacitor having a value such that line K—L, and therefore line C—E, coincide with line F—H, it will be understood that if the probe is now moved, point G will again move along line F—H as before and point D will again move along line C—E. However, since these lines coincide, being offset in FIG. 7 only for clarity of illustration, it can be seen that, for each point G, there will be a point D coinciding with point G, so that the voltage across D—G can be made zero for any position of the probe. Thus, by the introduction of capacitors 56 and 60 in series with the resistors 58 and 62, respectively, a very desirable result is obtained, i.e. that of being able to provide a zero voltage across D—G for any position of the potentiometer 37 along the slide wire.

In the operation of the balance, an unknown weight may be placed on pan 15 of FIG. 1 and a standard weight, approximating the weight of the unknown, placed on the other pan 14, although the placement of the unknown and standard may be reversed, as indicated previously and as shown in FIG. 1. As the beam balance is deflected, probe 22 will be moved a greater distance into one of the transducer coils 30 or 31 and out of the other coil, changing the inductance of the respective coils. An unbalance is thus created in the bridge circuit, causing a potential difference to appear at the output thereof. The output from the bridge is amplified and the amplified output is rectified, while the rectified output is applied to the chopper input of the recorder and energizes servo motor 38 of FIG. 3, which moves the slide wire of potentiometer 37 in a direction to balance the bridge circuit. Since pen 40 is coupled to the slide wire and servo motor, it will produce the trace 43 on chart 41, representative of the movement of the slide wire necessary to produce a balance in the bridge circuit. When chart 41 is moved at a constant speed by rollers 42 and 42', trace 43 will be recorded as a function of time.

Automatically switched weights are suspended by the weight switching mechanism W of FIG. 1 and are operated by cams and a motor under the balance floor (not shown because conventional). Whenever pen 43 approaches either side of chart 41, the weights are automatically added or subtracted, as required, in predetermined increments. This addition or removal of weights causes the pen to move to the other end of the range, as represented by the opposite edge of the chart. When making a set-up, it is not necessary to counterbalance the unknown exactly with weights or tares. Within the range of the switch weights, the recording balance will automatically add or subtract weights as required to balance the beam to the nearest 100 mg., and the recorder will chart the value within the 100 mg. range. This line on the chart can be taken as the zero point in most cases. The operating voltage for the transducer T need be only a few volts, such as from 0.3 volt to 5 volts and conveniently about 3 volts, while the frequency may be on the order of 3 to 15 kilocycles, such as between 6 and 10 kilocycles.

In a particular balance embodying the invention, a recorder chart eleven inches wide is calibrated to cover the range from −5 mg. to +105 mg., and can be read in increments of $\frac{1}{10}$ mg. The automatically switched weights are added or subtracted in 100 milligram increments. The switch weights total 4 grams, which is equivalent to 40 chart widths; and each weight or combination of weights is accurate within $\frac{1}{1000}$ of the chart width. With the use of manually applied weights, the capacity of the balance may be increased to 200 grams.

The automatic recording balance utilizing the circuit of this invention combines the range and accuracy of an analytical balance with a continuous record and automatic operation. The operation of the balance is simple, since the controls are essentially the usual beam and pan release on the balance and an off-on switch for the recorder and the zero point and sensitivity are normally adjusted on the balance. The circuit of this invention reduces the error voltage of the transducer and provides stability, while there is an electrical fine adjustment for zero point by variable resistor 57 and for sensitivity by variable resistor 65, and each of the latter may be operated by a knob on the front of the recorder cabinet.

Although in the embodiment above-described the invention is applied to a beam balance system, it will be understood that the invention may also be applied to other types of balance systems. Also, while a preferred embodiment of this invention has been described, it will be evident that other embodiments may exist and that various changes and modifications may be made therein, without departing from the spirit and scope of this invention.

What is claimed is:

1. An improved circuit adapted for use in an automatic balance system, comprising an oscillator circuit having at least one output; a bridge circuit having an input and output, said bridge circuit including a pair of serially connected transducer coils tapped at their point of connection as one pair of legs and a resistance element having a sliding tap as the other pair of legs, each end of said resistance element being connected through a capacitor to an end of a transducer coil to complete said bridge whereby the output of said bridge will have a fixed phase; means coupling the output of said oscillator circuit to the input of said bridge circuit; an amplifier circuit having an input and output; means connected to said amplifier output for balancing said bridge circuit; and means coupling the output of said bridge circuit to the input of said amplifier circuit.

2. An improved circuit adapted for use in an automatic balance system, comprising an oscillator circuit having at least one output; a bridge circuit having an input and an output; means coupling the output of said oscillator circuit to the input of said bridge circuit; an amplifier circuit having an input and output; means connected to said amplifier output for balancing said bridge circuit; means coupling the output of said bridge circuit to the input of said amplifier circuit, said amplifier circuit including output transformer means provided with split secondary windings and including a potentiometer having a resistance element serially connected between the centermost ends of each of said windings and having a sliding tap; and means coupling an output of said oscillator circuit to said sliding tap of said potentiometer, thereby providing means for adjusting the symmetry of said amplifier circuit.

3. An improved circuit adapted for use in an automatic balance system, comprising an oscillator circuit having at least one output; a bridge circuit including a pair of serially connected transducer coils tapped at their point of connection as one pair of legs and a resistance element having a sliding tap as the other pair of legs, each end of said resistance element being connected through a capacitor to an end of a transducer coil to complete said bridge circuit; means coupling the output of said oscillator circuit to the input of said bridge circuit; an amplifier circuit having an input and an output; means connected to said amplifier output for balancing said bridge circuit; means coupling the output of said bridge circuit to the input of said amplifier circuit, said amplifier circuit including output transformer means having a near center tapped secondary winding; and means coupling an output of said oscillator circuit to said central tap of the secondary winding of said amplifier output transformer.

4. A circuit as set forth in claim 3, wherein said oscillator circuit has two independent outputs, one output being connected to said bridge intermediate said transducer coils and its respective capacitor coupling, and the other output being coupled to the central tap of the amplifier output transformer.

5. A circuit adapted for use in an automatic balance system including an oscillator circuit, a bridge circuit having an input connected to an output of said oscillator circuit, an amplifier having an input connected to the output of said bridge circuit and having a secondary output transformer winding connected to an output of said oscillator circuit and means connected to said amplifier circuit for balancing said bridge circuit, the improvement comprising a bridge circuit having a pair of serially connected transducer coils forming one pair of legs; a resistance element having a sliding tap forming the other pair of legs; a wire at the point of connection of said transducer coils forming an output of said bridge circuit together with said sliding tap; and a capacitor connected in series in each resistance leg of said bridge circuit to adjust the phase of the voltage drop across said resistance legs, thereby reducing error voltage across said bridge circuit.

6. A circuit in accordance with claim 5, wherein said capacitors have capacitive voltages substantially matching the phase and magnitude of the resistive voltages across said transducer coils, so that the phase of the resistive voltage in said resistance legs is substantially identical to the phase of the inductive voltage in said transducer coils.

References Cited in the file of this patent

UNITED STATES PATENTS 2,439,891    Hornfeck _____ Apr. 20, 1948

(Other references on following page)

UNITED STATES PATENTS

| | | |
|---|---|---|
| 2,530,619 | Kliever | Nov. 21, 1950 |
| 2,594,436 | Hornfeck et al. | Apr. 29, 1952 |
| 2,624,027 | Clark | Dec. 30, 1952 |
| 2,653,282 | Darling | Sept. 22, 1953 |
| 2,692,969 | Baring | Oct. 26, 1954 |
| 2,708,730 | Alexander et al. | May 17, 1955 |
| 2,794,971 | Hornfeck | June 4, 1957 |
| 2,915,689 | Popowsky | Dec. 1, 1959 |
| 2,962,641 | Maltby et al. | Nov. 29, 1960 |

OTHER REFERENCES

American Standard Definitions of Electrical Terms, published by A.I.E.E., New York, 1942, p. 48, Definitions of Permeance and Reluctance.

Cockrell, W. D.: Industrial Electronic Control, first edition, McGraw-Hill, New York, 1944, p. 140; Fig. 118.

Greenwood, Holdam, MacRae: Electronic Instruments, McGraw-Hill, New York, 1948, pp. 383–386.

Hill W. Ryland: Electronics in Engineering, first edition, McGraw-Hill, New York, 1949, p. 247, Fig. 15.9.